US012482069B2

(12) United States Patent
Liang et al.

(10) Patent No.: US 12,482,069 B2
(45) Date of Patent: Nov. 25, 2025

(54) METHOD FOR PROCESSING IMAGE, ELECTRONIC DEVICE AND STORAGE MEDIUM

(71) Applicant: Kunlunxin Technology (Beijing) Company Limited, Beijing (CN)

(72) Inventors: Zihao Liang, Beijing (CN); Jian Ouyang, Beijing (CN); Wei Qi, Beijing (CN); Jing Wang, Beijing (CN)

(73) Assignee: Kunlunxin Technology (Beijing) Company Limited, Beijing (CN)

( * ) Notice: Subject to any disclaimer, the term of this patent is extended or adjusted under 35 U.S.C. 154(b) by 287 days.

(21) Appl. No.: 17/888,824

(22) Filed: Aug. 16, 2022

(65) Prior Publication Data

US 2023/0099656 A1    Mar. 30, 2023

(30) Foreign Application Priority Data

Sep. 30, 2021   (CN) ........................ 202111164668.6

(51) Int. Cl.
*G06T 5/50*    (2006.01)

(52) U.S. Cl.
CPC ...... *G06T 5/50* (2013.01); *G06T 2207/20221* (2013.01)

(58) Field of Classification Search
CPC ............ G06T 5/50; G06T 2207/20221; G06T 3/4038; G06T 2200/32; G06T 2207/20081; G06T 2207/20084; G06N 3/045; G06N 3/08
See application file for complete search history.

(56) References Cited

U.S. PATENT DOCUMENTS

| | | | |
|---|---|---|---|
| 11,195,080 B1 * | 12/2021 | Nama | G06N 3/063 |
| 2007/0047016 A1 * | 3/2007 | Borders | H04N 1/00087 |
| | | | 358/406 |
| 2018/0350110 A1 * | 12/2018 | Cho | G06F 7/08 |

FOREIGN PATENT DOCUMENTS

CN    112989270 A    6/2021

OTHER PUBLICATIONS

Zhao et al.., "Detecting Digital Image Splicing in Chroma Space", Springer-Verlag pub.2011, (Year: 2011).*
Zhao et al., "Detecting Digital Image Splicing in Chroma Space", Springer-Verlag pub.2011, Zhao et al (Year: 2011).*

* cited by examiner

*Primary Examiner* — Mekonen T Bekele

(74) *Attorney, Agent, or Firm* — Seed IP Law Group LLP

(57) ABSTRACT

A method for processing an image, an electronic device, and a storage medium are provided. The method includes: acquiring an input image, the input image including a plurality of channels, and each channel of the plurality of channels including a plurality of pixel points; performing pixel extractions in parallel using a plurality of dedicated processing units on each channel of the input image, to obtain pixel point data for each corresponding pixel point of each channel; and splicing the pixel point data for each corresponding pixel point of each channel to obtain an output image.

16 Claims, 15 Drawing Sheets

METHOD FOR PROCESSING IMAGE, ELECTRONIC DEVICE AND STORAGE MEDIUM

CROSS-REFERENCE TO RELATED APPLICATIONS

The present application claims the priority of Chinese Patent Application No. 202111164668.6, titled "METHOD AND APPARATUS FOR PROCESSING IMAGE, ELECTRONIC DEVICE, STORAGE MEDIUM AND PROGRAM PRODUCT", filed on Sep. 30, 2021, the content of which is incorporated herein by reference in its entirety.

BACKGROUND

Technical Field

The present disclosure relates to computer technology, and more particularly, to a method for processing an image, an electronic device, and a computer readable storage medium, which may be used in the field of artificial intelligence, in particular in the field of image processing and the like.

Description of the Related Art

Deep learning has been widely used today. With the diversification of models and the increasing demand for computing power, considering factors (such as performance and cost) of general processors, graphics processing units and the like in an existing deep learning hardware platform, the industry begins to develop self-developed deep learning accelerators.

Convolutional layers are extremely common layers in neural networks. In forward calculation of a convolutional layer, several convolution kernels are required to perform convolution operations on an input image. A common implementation is to perform an im2col operation on the input image, so that the convolution operation can be transformed into a matrix multiplication. In a training process, however, a reverse calculation is also needed, a weight gradient and a gradient of an input image of a current layer need to be calculated based on a gradient of an output image of the current layer, and then propagated to a forward layer in turn. The weight gradient is solved by multiplying the gradient of the output image by the input image on which the im2col operation is performed. During a hardware calculation, in order to acquire high throughput, data needs to be organized into continuous data of the dimension used in the multiplying and the data is output to a matrix operation unit, which is equivalent to performing the im2col operation and a transpose operation.

However, the technical efficiency of the reverse weight gradient calculation in traditional technologies is low, which is difficult to meet the needs of users.

BRIEF SUMMARY

According to embodiments of the present disclosure, a method for processing an image, an electronic device and a computer readable storage medium, are provided.

According to a first aspect, a method for processing an image is provided, which includes: acquiring an input image, the input image comprising a plurality of channels, and each channel of the plurality of channels comprising a plurality of pixel points; performing pixel extractions in parallel using a plurality of dedicated processing units on each channel of the input image, to obtain pixel point data for each corresponding pixel point of each channel; and splicing the pixel point data for each corresponding pixel point of each channel to obtain an output image.

According to a second aspect, an electronic device is provided, which includes: at least one processor; and a memory communicatively connected to the at least one processor; where the memory stores instructions executable by the at least one processor, and the instructions, when executed by the at least one processor, cause the at least one processor to perform the method according to the first aspect of the disclosure.

According to a third aspect, a non-transitory computer readable storage medium storing computer instructions is provided, where the computer instructions are used to cause the computer to perform the method according to the first aspect of the disclosure.

It should be understood that contents described in this section are neither intended to identify key or important features of embodiments of the present disclosure, nor intended to limit the scope of the present disclosure. Other features of the present disclosure will become readily understood in conjunction with the following description.

BRIEF DESCRIPTION OF THE SEVERAL VIEWS OF THE DRAWINGS

The above and other objectives, features and advantages of the present disclosure will become more apparent from more detailed description of example embodiments of the present disclosure in conjunction with the accompanying drawings. In the example embodiments of the present disclosure, the same reference numerals generally refer to the same parts. It should be understood that the accompanying drawings are for better understanding of the present solution and do not constitute a limitation to the present disclosure.

In the accompanying drawings, the same or corresponding reference numerals designate the same or corresponding parts.

DETAILED DESCRIPTION

Figure 1:
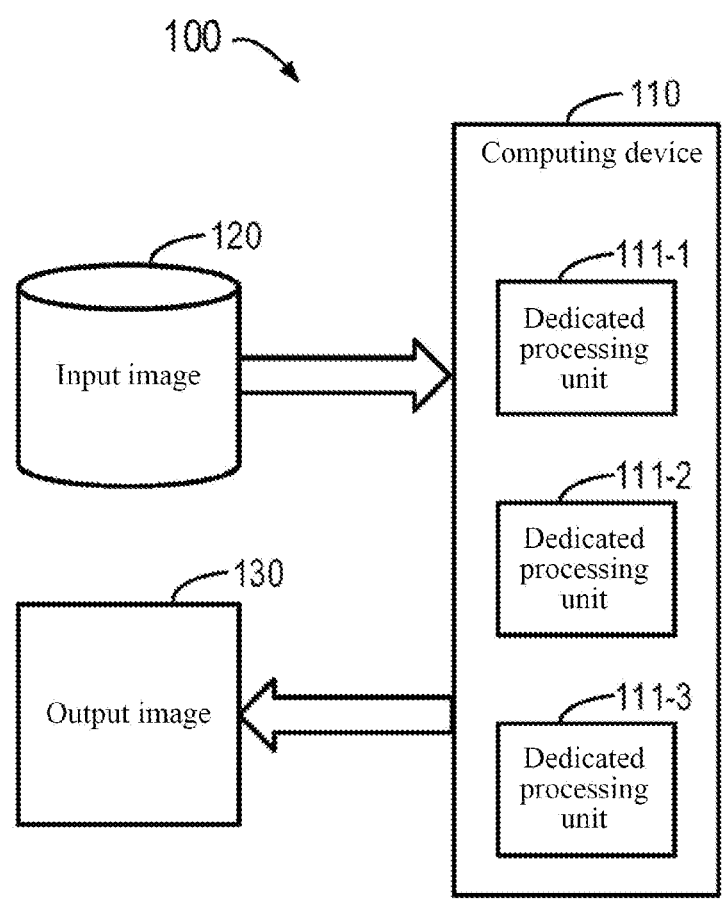
FIG. 1 shows a schematic block diagram of an image processing environment 100 in which a method for processing an image in some embodiments of the present disclosure may be implemented.

Preferred embodiments of the present disclosure will be described in more detail below with reference to the accompanying drawings. While the preferred embodiments of the present disclosure are shown in the accompanying drawings, it should be understood that the present disclosure may be embodied in various forms and should not be limited by the embodiments set forth herein. Rather, these embodiments are provided so that the present disclosure will be thorough and complete, and the scope of the present disclosure will be fully conveyed to those skilled in the art.

As used herein, the term "including" and variations thereof indicate open-ended inclusion, i.e., "including but not limited to". The term "or" indicates "and/or" unless specifically stated otherwise. The term "based on" indicates "based at least in part on". The terms "an example embodiment" and "an embodiment" indicate "at least one example embodiment". The term "another embodiment" indicates "at least one additional embodiment". The terms "first", "second", etc., may refer to different or the same objects. Other explicit and implicit definitions may also be included below.

As described above in the Background section, the technical efficiency of the reverse weight gradient calculation in traditional technologies is low, which is difficult to meet the needs of users.

Specifically, convolutional layers are extremely common layers in neural networks. In forward calculation of a convolutional layer, several convolution kernels are needed to perform convolution operations on an input image. In HWC format, assuming that an image size is $in\_h*in\_w*c$, a size of the convolution kernels, which may also be called a weight, is $f*r*s*c$, and a size of an output image on which the convolution operation is performed is $f*out\_h*out\_w$, where c is the number of channels of the input image, $in\_h$ is a height of the input image, $in\_w$ is a width of the input image, f is the number of convolution kernels, r is a height of the convolution kernels, s is a width of the convolution kernels, $out\_h$ is a height of the output image, and $out\_w$ is a width of the output image. Units of these heights and widths may be pixels.

A common implementation is to perform an im2col operation on the input image, which converts an image portion passed by the convolution kernels into $out\_h*out\_w$ one-dimensional vectors, a length of each one-dimensional vector being $r*s*c$, that is, transformed into $[out\_h*out\_w, r*s*c]$. In this regard, the convolution operation can be transformed into a matrix multiplication, and a size of the matrix multiplication is $[f, r*s*c] \cdot [r*s*c, out\_h*out\_w] = [f, out\_h*out\_w]$.

In a training process, reverse calculation is also needed, in which a weight gradient and a gradient of an image of a current layer need to be calculated based on a gradient of an output image of the current layer, and then propagated to a forward layer in turn. The weight gradient is solved by multiplying the output image gradient by the input image on which the im2col operation is performed, and the size is $[f, out\_h*out\_w] \cdot [out\_h*out\_w, r*s*c] = [f, r*s*c]$, where $out\_w*out\_h$ is a dimension of the multiply-accumulate operation.

During hardware calculation, in order to acquire high throughput, data needs to be organized into continuous data in the dimension and output to a matrix operation unit, where the output image gradient is $[f, out\_h*out\_w]$, no additional processing is needed, and the input image needs to be processed into $[r*s*c, out\_h*out\_w]$ format from $[in\_h*in\_w, c]$, which is equivalent to performing the im2col operation and a transpose operation, so the improvement of its processing efficiency is of great significance to the weight gradient calculation.

In traditional technologies, two solutions are generally used to solve the weight gradient calculation in deep learning reverse calculation. One solution is to use a general processor to execute general instructions using a register file and a general computing unit, thereby completing the deep learning reverse calculation, and the other solution is to use a dedicated processing unit that uses a graphics processing unit, and use a register file and a stream processing unit to execute single-instruction, multiple-data (SIMD) instructions to complete the deep learning reverse calculation.

However, both of the above solutions have serious deficiencies.

For the first solution, its implementation is relatively simple, but general processors are often suitable for scalar computing, showing insufficient computing power and low overall performance in deep learning-related calculations.

For the second solution, there is still a lack of specific implementation details.

In order to at least partially solve one or more of the above problems and other potential problems, the embodiments of the present disclosure propose a method for processing an image. The method may flexibly support format processing of input images of various sizes by using the technical solution according to the embodiments of the present disclosure, can make full use of the parallelism characteristics of hardware, and efficiently perform pixel extraction, so as to support efficient weight gradient calculation, improve the throughput of an overall calculation process, and thus improve user experience.

FIG. 1 shows a schematic block diagram of an image processing environment 100 in which a method for processing an image in some embodiments of the present disclosure may be implemented. According to one or more embodiments of the present disclosure, the image processing environment 100 may be a cloud environment.

As shown in FIG. 1, the image processing environment 100 includes a computing device 110, and the computing device 110 includes a dedicated processing unit 111-1, a dedicated processing unit 111-2, and a dedicated processing unit 111-3, which may be collectively referred to as a dedicated processing unit 111. It should be understood that the three dedicated processing units 111 are shown in FIG. 1 only for the purpose of example, and more or less dedicated processing units 111 may be included in the image processing environment 100 according to different functions and user requirements. According to one or more embodiments of the present disclosure, the dedicated processing unit 111 may be, for example, a dedicated processing unit such as a graphics processing unit, or a processing core in the aforementioned dedicated processing units.

In the image processing environment 100, the computing device 110 acquires an input image 120. According to one or more embodiments of the present disclosure, the input image 120 may be an input image 120 in the HWC format, and an image size of the input image 120 may be $in\_h*in\_w*c$. Thus, the input image 120 may include a plurality of channels, and each channel includes $in\_w$ rows of pixels.

According to one or more embodiments of the present disclosure, for the input image 120 of the HWC format, data in the dimension of channel C is continuous, and a storage sequence is that after a corresponding pixel point for each channel is completely stored, another pixel point corresponding to each channel is stored. For example, if the input image 120 is an RGB image file, after the RGB of the corresponding pixel point for each channel is completely stored, the RGB of another pixel point corresponding to each channel is stored.

After acquiring the input image 120, the computing device 110 may use the dedicated processing units 111 in the computing device 110 to perform pixel extractions in parallel on respective channels in the input image 120 to obtain pixel point data for each corresponding pixel point of each channel. Then, the computing device 110 may use the dedicated processing units 111 in the computing device 110 to splice the pixel point data for each corresponding pixel point of each channel, thereby obtaining an output image 130.

It should be understood that the image processing environment 100 is merely example and not limiting, and is expandable. The image processing environment 100 may include more computing devices 110, and more input images 120 may be acquired by the computing devices 110, and more dedicated processing units 111 may be for the input images 120, so that more users may use the more computing devices 110 to perform pixel extractions in parallel at the same time, so that more output images 130 may be obtained. Therefore, the user requirement to use more computing devices 110 and the dedicated processing units 111 in the computing devices to process more input images 120 simultaneously or non-simultaneously to obtain more output images 130 may be satisfied.

In the image processing environment 100 as shown in FIG. 1, the process of acquiring the input image 120 and providing the output image 130 by the computing device 110 may be performed through a network.

Figure 2:
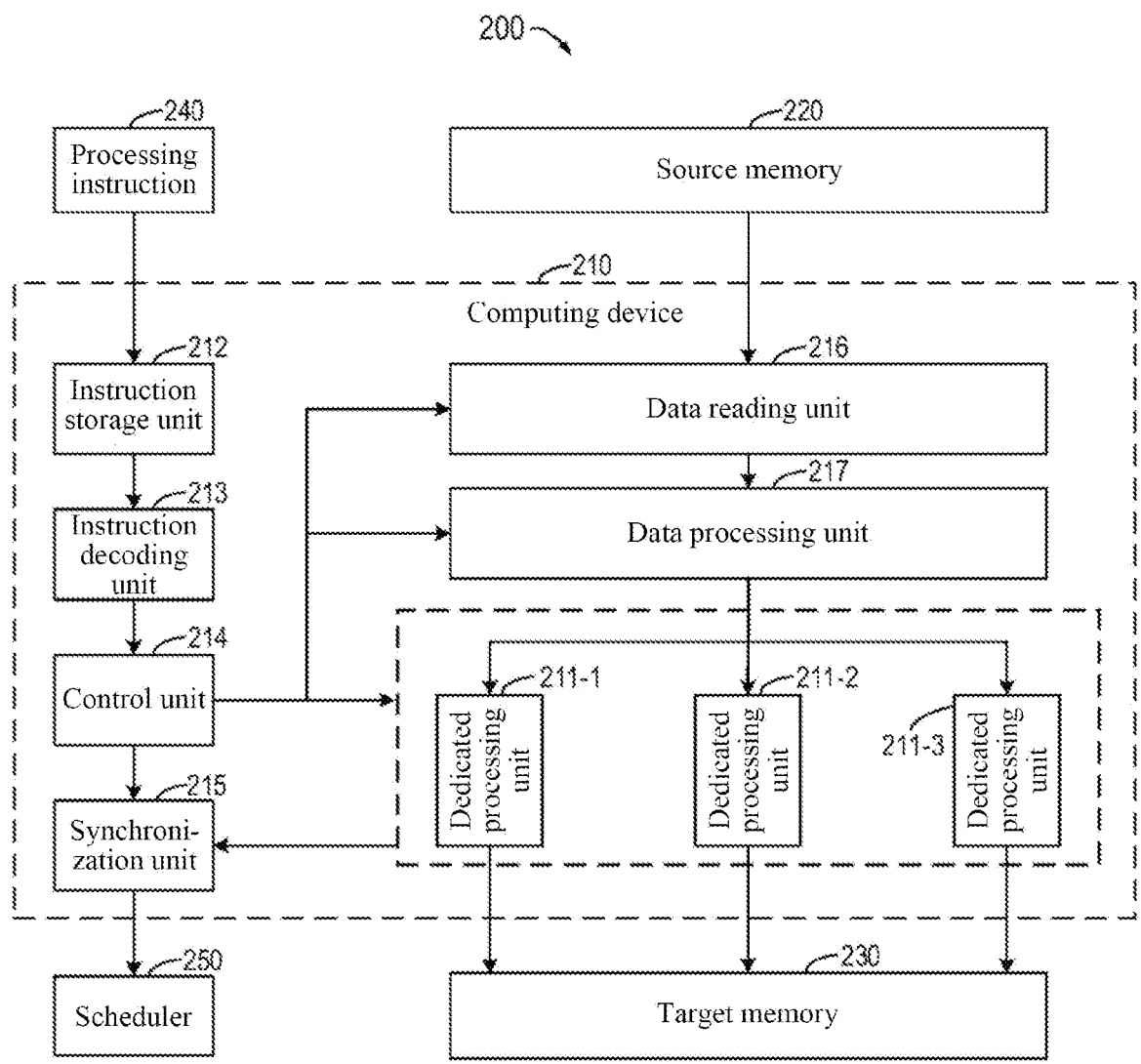
FIG. 2 shows a schematic block diagram of an image processing environment 200 in which a method for processing an image in some embodiments of the present disclosure may be implemented.

FIG. 2 shows a schematic block diagram of an image processing environment 200 in which a method for processing an image in some embodiments of the present disclosure may be implemented. According to one or more embodiments of the present disclosure, the image processing environment 200 may be a cloud environment.

As shown in FIG. 2, the image processing environment 200 includes a computing device 210, and the computing device 210 includes a dedicated processing unit 211-1, a dedicated processing unit 211-2, and a dedicated processing unit 211-3, which may be collectively referred to as a dedicated processing unit 211. It should be understood that the three dedicated processing units 211 are shown in FIG. 2 only for the purpose of example, and more or less dedicated processing units 211 may be included in the image processing environment 200 according to different functions and user requirements. According to one or more embodiments of the present disclosure, the dedicated processing unit 211 may be, for example, a graphics processing unit.

In addition to the dedicated processing unit 211, the computing device 210 also includes an instruction storage unit 212, an instruction decoding unit 213, a control unit 214, a synchronization unit 215, a data reading unit 216, and a data processing unit 217.

Also included in the image processing environment 200 is a source memory 220 from which the computing device 210 may acquire the input image 120, a target memory 230 to which the computing device 210 may store the output image 130, processing instructions 240 that may be input to the computing device 210 for performing various operations, and a scheduler 250 that schedules various operations performed by the computing device 210. According to one or more embodiments of the present disclosure, the input image 120 may be the input image 120 in the HWC format as described with reference to FIG. 1.

According to one or more embodiments of the present disclosure, the source memory 220 and the target memory 230 may be various types of memory, such as static random access memory (SRAM). In addition, the source memory 220 and the target memory 230 may alternatively be combined into a given memory.

The instruction storage unit 212 is configured to store the acquired processing instructions 240. For data conversion, the processing instructions 240 include, but are not limited to: parameter configuration instructions, data operation instructions, synchronization instructions, and the like. The parameter configuration instructions are used to configure parameters including but not limited to: data type, size of input image, size of convolution kernel or weight, convolution stride, padding size, memory address and offset, and so on. The data operation instruction is used to initiate a subsequent hardware execution action. The synchronization instruction is used to ensure that all instructions before the instruction are executed and the data is placed on the disk for the scheduler to synchronize modules.

When the instruction decoding unit 213 detects that the instruction storage unit 212 is not empty, and can currently execute instructions, the instruction decoding unit 213 reads the processing instructions from the instruction storage unit 212 and parses the instructions, and sends the parsed content to the control unit 214.

The control unit 214 generates a corresponding control signal based on the configuration parameters, and the control signal may be used to control the following: a read request operation of the data reading unit 216, operations of the data processing unit 217 and the dedicated processing unit 211, and an operation of the synchronization unit 215.

The data reading unit 216 sends a read request to the source memory 220 according to the control signal from the control unit 214. According to the control signal of the control unit 214, the data reading unit 216 may initiate multiple read requests to the source memory 220.

The data processing unit 217 and the dedicated processing unit 211 perform specific operations on the read data according to the control signal of the control unit 214. For example, for each channel in the read input image 120, pixel extractions are performed in parallel to obtain pixel point data for each corresponding pixel point of each channel.

After receiving a synchronization request, the synchronization unit 215 outputs a synchronization completion signal to the scheduler 250 after detecting that a current instruction is completed and the data is placed on the disk.

Specifically, according to one or more embodiments of the present disclosure, an operation flow of the computing device 210 may include: acquiring the processing instructions 240 including the configuration instructions, the data operation instructions and the synchronization instructions into the instruction storage unit 212; the instruction decoding unit 213 decoding the instructions, and the control unit 214 outputting the control signal to the subsequent modules such as the data reading unit 216, the data processing unit 217, the dedicated processing unit 211 and the synchronization unit 215 based on the parameter configurations. The data reading unit 216 initiates continuous read operations to the source memory 220 in a specific way according to the control signal. After the read data is returned, the data processing unit 216 performs operations such as shifting and padding the data according to the control signal. The dedicated processing unit 211 acquires the data from the data processing unit 217, and synchronously performs extraction and splicing operations on data belonging to its responsible part according to the control signal, and finally writes the data to the target memory 230. When the dedicated processing unit 211 processes the data, different dedicated processing units 211 are responsible for processing different points on the convolution kernel, and during the entire processing, the control unit 214 may perform several cycles until all the points of the entire convolution kernel are cycled. After all the data are placed on the disk, the synchronization module 215 make a determination according to the control signal of the control unit 214 and the control signal returned by the dedicated processing unit 211, and returns an operation completion signal to the scheduler 250 to indicate that the data operation has been completed.

It should be understood that the image processing environment 200 is also an example rather than limiting, and is expandable. In addition, in the image processing environment 200 as shown in FIG. 2, the process of the computing device 210 acquiring the input image 120 from the source memory 220, providing the output image 130 to the target memory 230, acquiring the instructions 240, and interacting with the scheduler 250 may be performed through a network.

Figure 3:
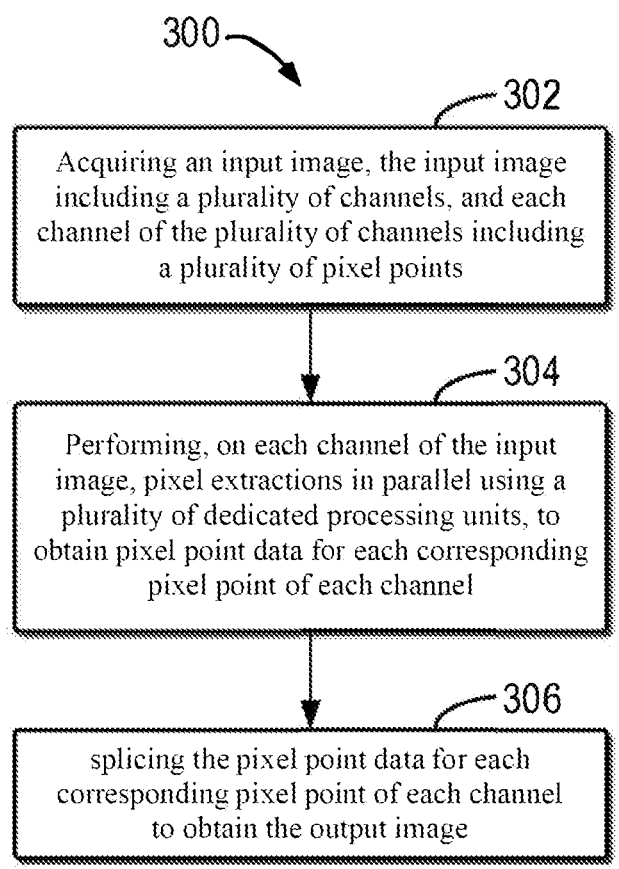
FIG. 3 shows a flowchart of a method 300 for processing an image according to an embodiment of the present disclosure.

FIG. 3 shows a flowchart of a method 300 for processing an image according to an embodiment of the present disclosure. In this regard, the method 300 for processing an image may be performed by the computing device 110 in the image processing environment 100 shown in FIG. 1 or the computing device 210 in the image processing environment 200 shown in FIG. 2. It should be understood that the method 300 for processing an image may also include additional operations not shown and/or the operations shown may be omitted, and the scope of the present disclosure is not limited in this regard. The steps of the method 300 for processing an image are described below by taking the computing device 110 as an executing body as an example.

At block 302, the computing device 110 acquires an input image. According to one or more embodiments of the present disclosure, the input image may be an input image in HWC format, and includes a plurality of channels, and each channel of the plurality of channels includes a plurality of pixel points.

A form of the input image will be described below with reference to FIG. 4.

Figure 4:
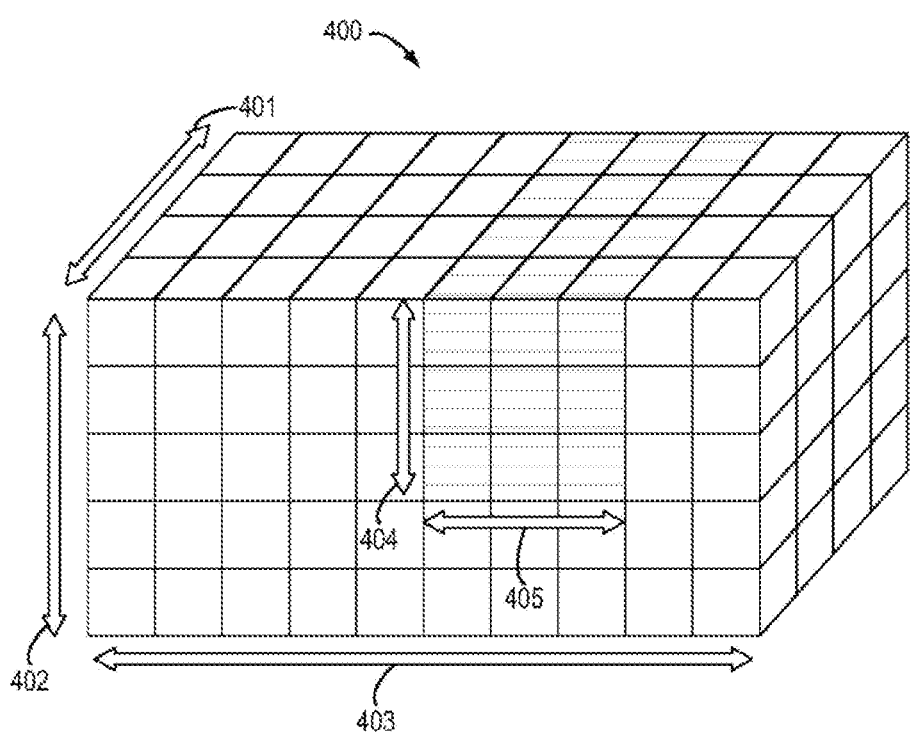
FIG. 4 shows a schematic diagram of an input image 400 according to an embodiment of the present disclosure.

FIG. 4 shows a schematic diagram of an input image 400 according to an embodiment of the present disclosure. As shown in FIG. 4, the input image 400 has one convolution kernel represented by a horizontally shaded portion. Reference numeral 401 represents the number of channels c of the input image 400, and also represents the number of channels of the convolution kernel. Reference numeral 402 and reference numeral 403 represent a height in_h and a width in_w of the input image 400, respectively, which may also be regarded as a column dimension and a row dimension of the input image 400, respectively. Reference numeral 404 and reference numeral 405 represent a height r and a width s of the convolution kernel, respectively. According to one or more embodiments of the present disclosure, the unit of the height in_h and the width in_w of the input image may be pixels of the input image 400.

In the method 300, first, the input image 400 and the number of channels c of the convolution kernel being 3 are used as an example for description.

At block 304, the computing device 110 performs pixel extractions in parallel using a plurality of dedicated processing units 111 for each channel of the input image to obtain pixel point data for each corresponding pixel point of each channel.

In a forward calculation process of a convolutional layer, the convolution kernel may move in a row direction by stride and traverse the entire row, then return to the beginning of the row, move down by stride, and continue traversing the entire row in the row direction, repeat the above operations until an entire image traversal is completed. One implementation is to extract the data covered by the convolution kernel each time the convolution kernel moves by stride, and unfold the data into one-dimensional vectors, that is, an im2col operation. An matrix size for the unfolded data is [out_h*out_w, c*r*s]. Then, matrix multiplication is performed between data on which the im2col operation is performed, and the convolution kernel, and the size of the matrix multiplication is [f, r*s*c]·[r*s*c, out_h*out_w]=[f, out_h*out_w]. It should be noted that a dimension of the accumulation of the matrix multiplication formula is [c*r*s], and two matrices input into a matrix multiplication module are generally row storage and column storage, respectively, so that the data on which the im2col operation is performed actually does not need to be transposed.

In backward weight gradient calculation, matrix multiplication operation needed to be performed between an output data weight and the input data on which the im2col operation is performed, and the size of the matrix multiplication is [f, out_h*out_w]·[out_h*out_w, r*s*c]=[f, r*s*c]. Since the dimension of the accumulation is [out_h*out_w], the input data needed to be organized into [r*s*c, out_h*out_w] format, and continuous storage of the out_h*out_w dimension can guarantee efficient supply to a matrix multiplication unit.

According to one or more embodiments of the present disclosure, the computing device 110 uses the plurality of dedicated processing units 111 to perform the pixel extractions in parallel to improve the efficiency of pixel extraction in the above process.

According to one or more embodiments of the present disclosure, the computing device 110 may add padding to an edge of at least one side of each channel of the input image to obtain the padded input image. Depending on an algorithm used and different actual requirements, the above padding may be pixels values of which are all 0 or 1, alternatively the values of the pixels may be values according to other preset rules, such as duplicating a value in the outermost pixel of the image. With this added padding, the computing device 110 may perform pixel extractions in parallel using the plurality of dedicated processing units 111 for each row of the plurality of rows of pixels included in the padded input image to obtain row data for each row of pixels.

According to one or more embodiments of the present disclosure, the computing device 110 may determine the number of paddings to be added based on a size of the input image and a width of a convolution kernel for performing the pixel extraction. Depending on an algorithm used and different actual requirements, the computing device 110 may adjust the number of paddings to be added for the purpose of resizing an output matrix corresponding to an output image generated from the input image or avoiding generating the aforementioned output matrix lacking data.

At block 306, the computing device 110 splices the pixel point data for each corresponding pixel point of each channel obtained at block 304 to obtain an output image. The operation in block 306 may likewise be performed by the computing device 110 using the dedicated processing unit 111 according to one or more embodiments of the present disclosure.

The method 300 for processing an image according to an embodiment of the present disclosure is described above with reference to FIG. 3. According to one or more embodiments of the present disclosure, the method 300 for processing an image may also be expanded with additional steps. The description will be made below with reference to FIG. 5.

Figure 5:
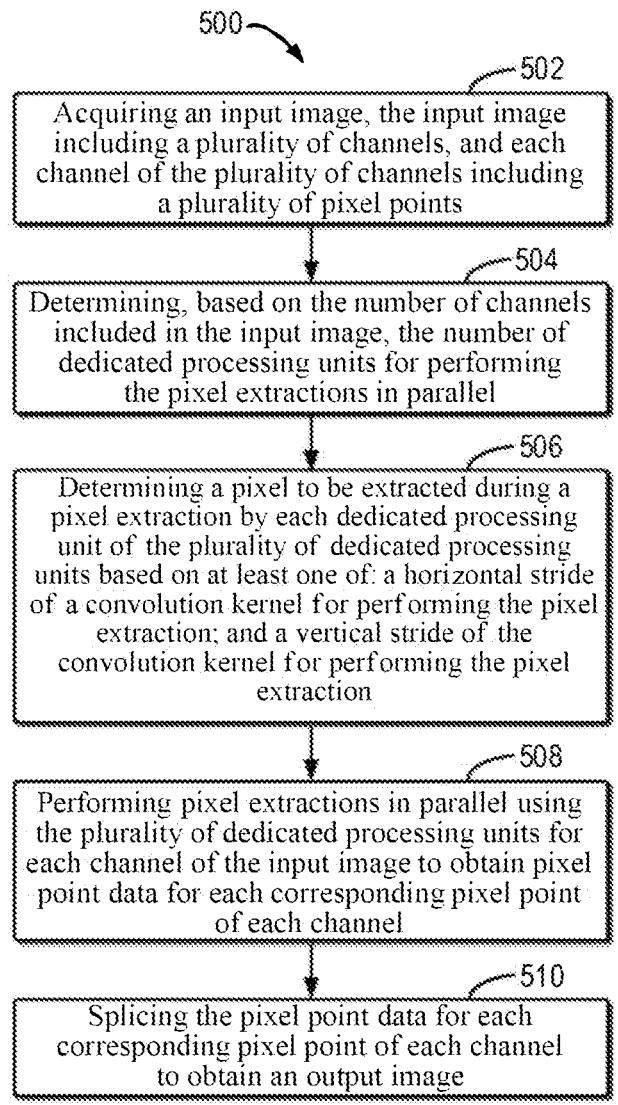
FIG. 5 shows a flowchart of a method 500 for processing an image according to an embodiment of the present disclosure.

FIG. 5 shows a flowchart of a method 500 for processing an image according to an embodiment of the present disclosure. In this regard, the method 500 for processing an image may be performed by the computing device 110 in the image processing environment 100 shown in FIG. 1 or the computing device 210 in the image processing environment 200 shown in FIG. 2. It should be understood that the method 500 for processing an image may also include additional operations not shown and/or the operations shown may be omitted, and the scope of the present disclosure is not limited in this regard. The steps of the method 500 for processing an image are described below by taking the computing device 110 as an executing body as an example.

At block 502, the computing device 110 acquires an input image. According to one or more embodiments of the present disclosure, the input image may be an input image in HWC format, and includes a plurality of channels, and each channel of the plurality of channels includes a plurality of pixel points. Detailed of the steps involved in block 502 are the same as those of the steps involved in block 302, and detailed description thereof will be omitted.

At block 504, the computing device 110 determines, based on the number of channels included in the input image, the number of dedicated processing units for performing the pixel extraction in parallel.

According to one or more embodiments of the present disclosure, when the number of dedicated processing units is not smaller than the number of channels of the input image, the efficiency of parallel calculation is highest. Therefore, when a plurality of dedicated processing units are available, an equal number of dedicated processing units may be determined for performing the pixel extractions in parallel based on the number of channels included in the input image, thereby maximizing the efficiency of image processing.

At block 506, the computing device 110 determines a pixel to be extracted during a pixel extraction by each dedicated processing unit of the plurality of dedicated processing units 111 based on at least one of: a horizontal stride of a convolution kernel for performing the pixel extraction; and a vertical stride of the convolution kernel for performing the pixel extraction.

According to one or more embodiments of the present disclosure, the horizontal stride and the vertical stride of the convolution kernel for performing the pixel extraction may be pre-configured according to the algorithm or user requirements. For example, if the horizontal stride of the convolution kernel for performing the pixel extraction is 2, then in each row of pixels, each dedicated processing unit 111 may select the corresponding pixel every other pixel each time the pixel extraction is performed.

According to one or more embodiments of the present disclosure, the steps involved in both the blocks 504 and 506 may not need to be included in method 500 at the same time, but only the steps involved in one of the blocks 504 and 506 may be included, or even the steps involved in both the blocks 504 and 506 may not be included.

At block 508, the computing device 110 performs pixel extractions in parallel using the plurality of dedicated processing units 111 on each channel of the input image to obtain pixel point data for each corresponding pixel point of each channel. Details of the steps involved in block 508 are the same as those of the steps involved in block 304, and detailed description thereof will be omitted.

At block 510, the computing device 110 splices the pixel point data for each corresponding pixel point of each channel obtained at block 508 to obtain an output image. Details of the steps involved in block 510 are the same as those of the steps involved in block 306, and detailed description thereof will be omitted.

The method 300 for processing an image according to an embodiment of the present disclosure and the method 500 for processing an image according to an embodiment of the present disclosure are described above with reference to FIG. 3 and FIG. 5, respectively. Input data changes in a method for processing an image brought about by the method 300 for processing an image or the method 500 for processing an image according to an embodiment of the present disclosure will be described below with reference to FIG. 6A to FIG. 6H.

Figure 6A:
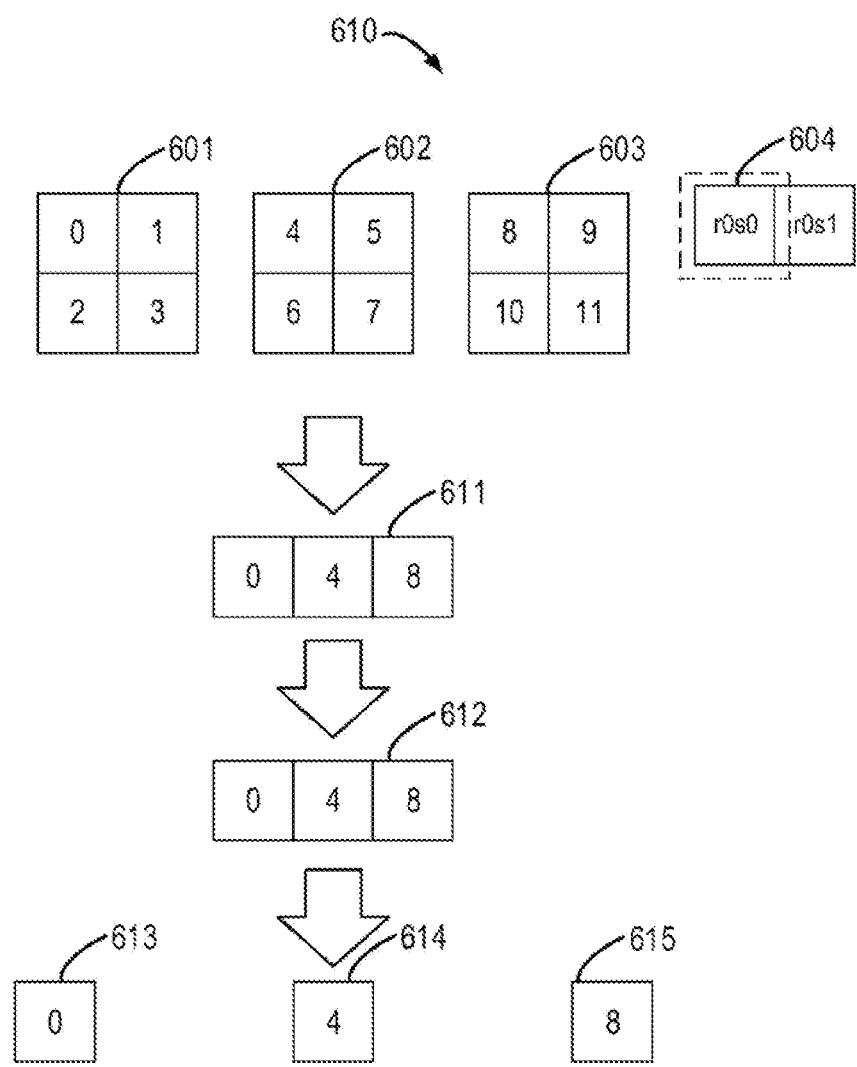
FIG. 6A to FIG. 6H illustrate schematic diagrams of input data changes 610 to 680 in the method for processing an image according to an embodiment of the present disclosure.

FIG. 6A shows a schematic diagram of input data change 610 in a method for processing an image according to an embodiment of the present disclosure. In the input data change 610 shown in FIG. 6A, reference numerals 601, 602, and 603 represent three different channels of an input image, where input data of each channel has a height of 2 columns and a width of 2 rows, and reference numeral 604 represents a convolution kernel with a height of 1 and a width of 2, which may also be called a filter.

In FIGS. 6A to 6H, the input image with a preset number of channels c=3, an input image height in_h=2, an input image width in_w=2, a convolution kernel height r=1, a convolution kernel width s=2, a horizontal stride stride_w=1, a vertical stride stride_h=1, an upper side padding pad_up=0, a down side padding pad_down=0, a left side padding pad_left=0, and a right side padding pad_right=1, and a number of dedicated processing units being 3 is taken as an example for description.

In FIG. 6A, a block r0s0 on the left in the convolution kernel 604 has a dotted box added to indicate that this block in the convolution kernel will be processed, reference number 611 represents data extracted from upper left pixels in the different channels 601, 602 and 603 of the input data, reference number 612 indicates that the data 611 may be for parallel computing without transformation, and reference numbers 613, 614 and 615 represent three separate data of the data 611 extracted from the upper left pixels in the different channels 601, 602 and 603 of the input data, processed by three dedicated data processing units, respectively.

It can be seen from FIG. 6A that the three dedicated data processing units respectively process the data 611 extracted from the upper left pixels in the different channels 601, 602 and 603 of the input data.

Figure 6B:
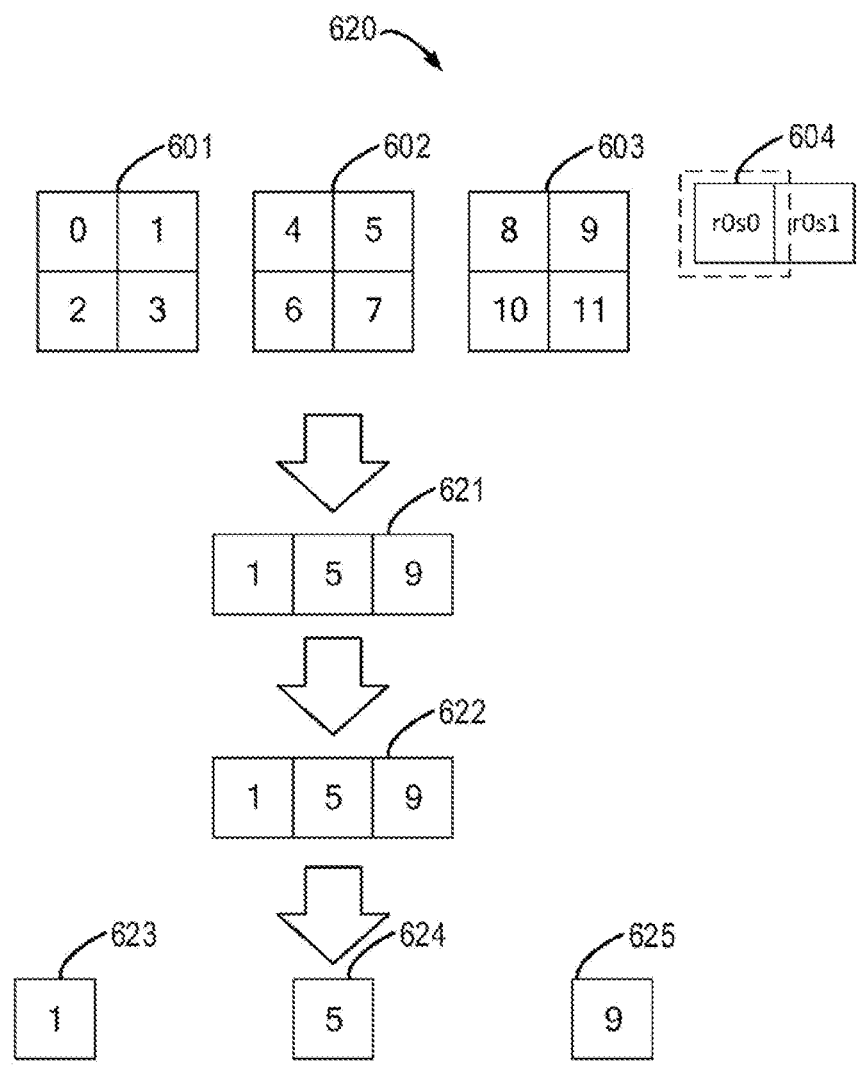

In FIG. 6B, a block r0s0 on the left portion of the convolution kernel 604 has a dotted box added to indicate that this block in the convolution kernel will be processed, reference number 621 represents data extracted from upper right pixels in the different channels 601, 602 and 603 of the input data, reference number 622 indicates that the data 621 may be for parallel computing without transformation, and reference numbers 623, 624 and 625 represent three separate data of the data 621 extracted from upper right pixels in the different channels 601, 602 and 603 of the input data, processed by three dedicated data processing units, respectively.

It can be seen from FIG. 6B that the three dedicated data processing units respectively process the data 621 extracted from the upper right pixels in the different channels 601, 602 and 603 of the input data.

Figure 6C:
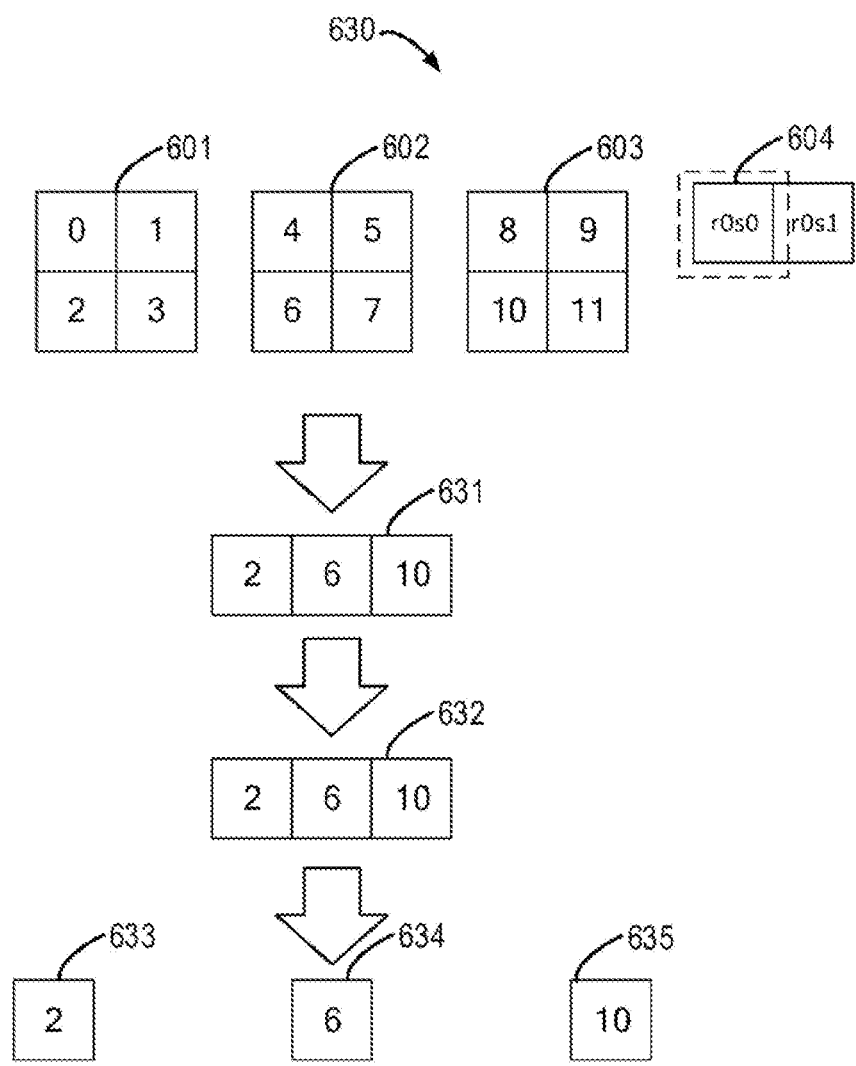

In FIG. 6C, a block r0s0 on the left portion in the convolution kernel 604 has a dotted box added to indicate that this block in the convolution kernel will be processed, reference number 631 represents data extracted from bottom left pixels in the different channels 601, 602 and 603 of the input data, reference number 632 indicates that the data 631 may be for parallel computing without transformation, and reference numbers 633, 634 and 635 represent three separate data of the data 631 extracted from the bottom left pixels in the different channels 601, 602 and 603 of the input data, processed by three dedicated data processing units, respectively.

It can be seen from FIG. 6C that the three dedicated data processing units respectively process the data 631 extracted from the bottom left pixels in the different channels 601, 602 and 603 of the input data.

Figure 6D:
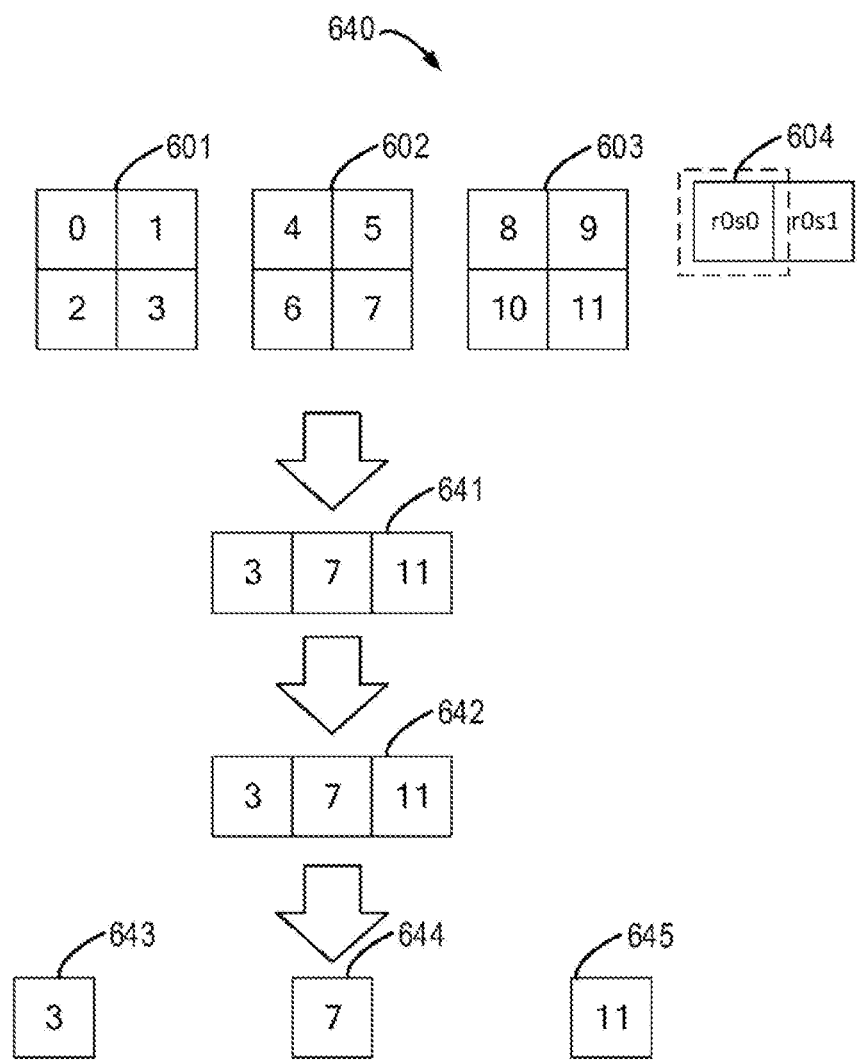

In FIG. 6D, a block r0s0 on the left portion in the convolution kernel 604 has a dotted box added to indicate that this block in the convolution kernel will be processed, reference number 641 represents data extracted from bottom right pixels in the different channels 601, 602 and 603 of the input data, reference number 642 indicates that the data 641 may be for parallel computing without transformation, and reference numbers 643, 644 and 645 represent three separate data of the data 641 extracted from the bottom right pixels in the different channels 601, 602 and 603 of the input data, processed by three dedicated data processing units, respectively.

It can be seen from FIG. 6D that the three dedicated data processing units respectively process the data 641 extracted from the bottom right pixel in the different channels 601, 602 and 603 of the input data.

Figure 6E:
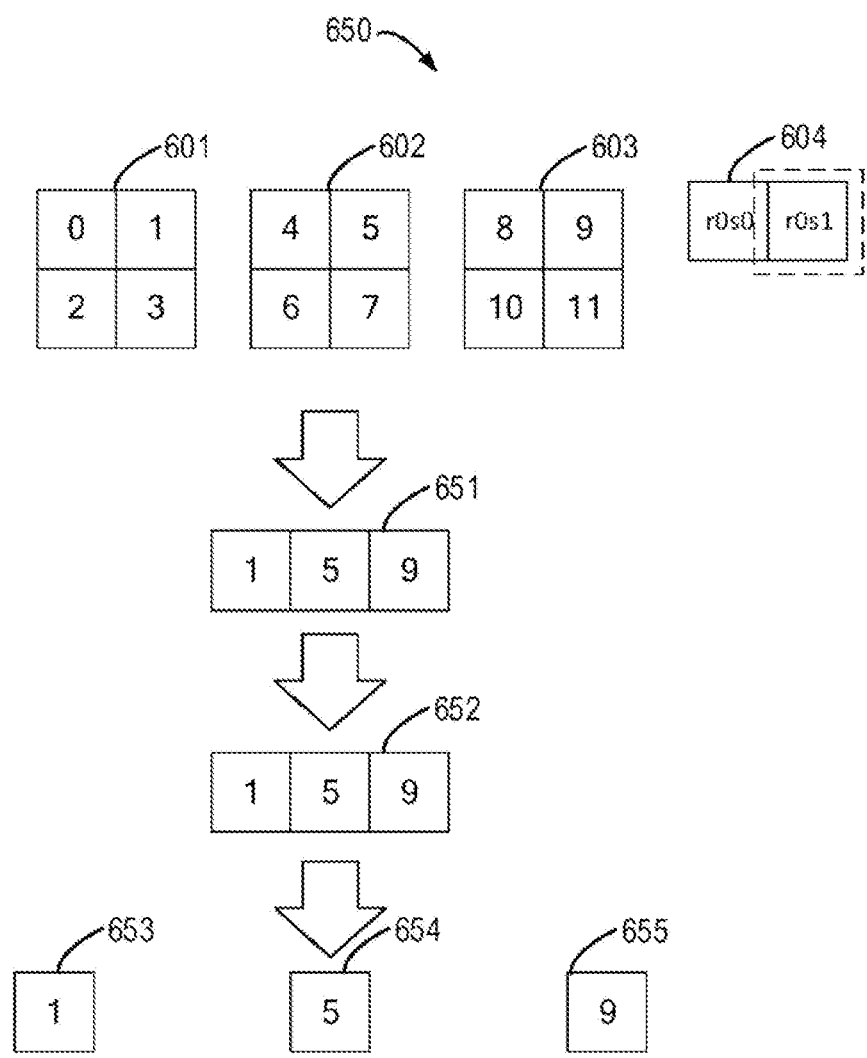

In FIG. 6E, a block r0s1 on the right in the convolution kernel 604 has a dotted box added to indicate that this block in the convolution kernel will be processed, reference number 651 represents data extracted from upper left pixels in the different channels 601, 602 and 603 of the input data, reference number 652 indicates that the data 651 may be for parallel computing without transformation, and reference numbers 653, 654 and 655 represent three separate data of the data 651 extracted from the upper left pixels in the different channels 601, 602 and 603 of the input data, processed by three dedicated data processing units, respectively.

It can be seen from FIG. 6E that the three dedicated data processing units respectively process the data 651 extracted from the upper left pixels in the different channels 601, 602 and 603 of the input data.

Figure 6F:
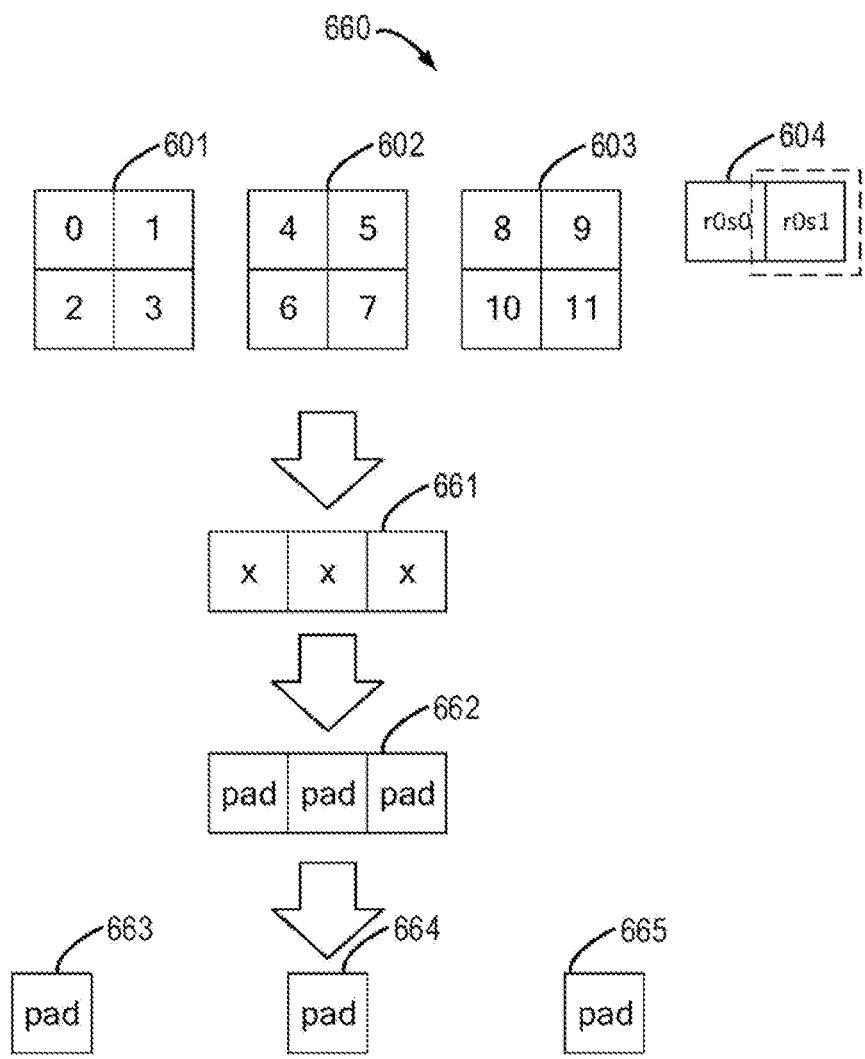

In FIG. 6F, a block r0s1 on the right portion in the convolution kernel 604 has a dotted box added to indicate that this block in the convolution kernel will be processed, reference number 661 represents data extracted from upper right pixels in the different channels 601, 602 and 603 of the input data, and x in the box identifying these data indicates that these data are padded according to preset parameters, reference number 662 indicates that the data 661 is transformed, and padding is added according to the preset parameters and for parallel computing, and reference numbers 663, 664 and 665 represent three separate data of the data 662 extracted from the upper right pixel in the different channels 601, 602 and 603 of the input data, processed by three dedicated data processing units, respectively.

It can be seen from FIG. 6F that the three dedicated data processing units respectively process the data 662 extracted from the upper right pixels in the different channels 601, 602 and 603 of the input data.

Figure 6G:
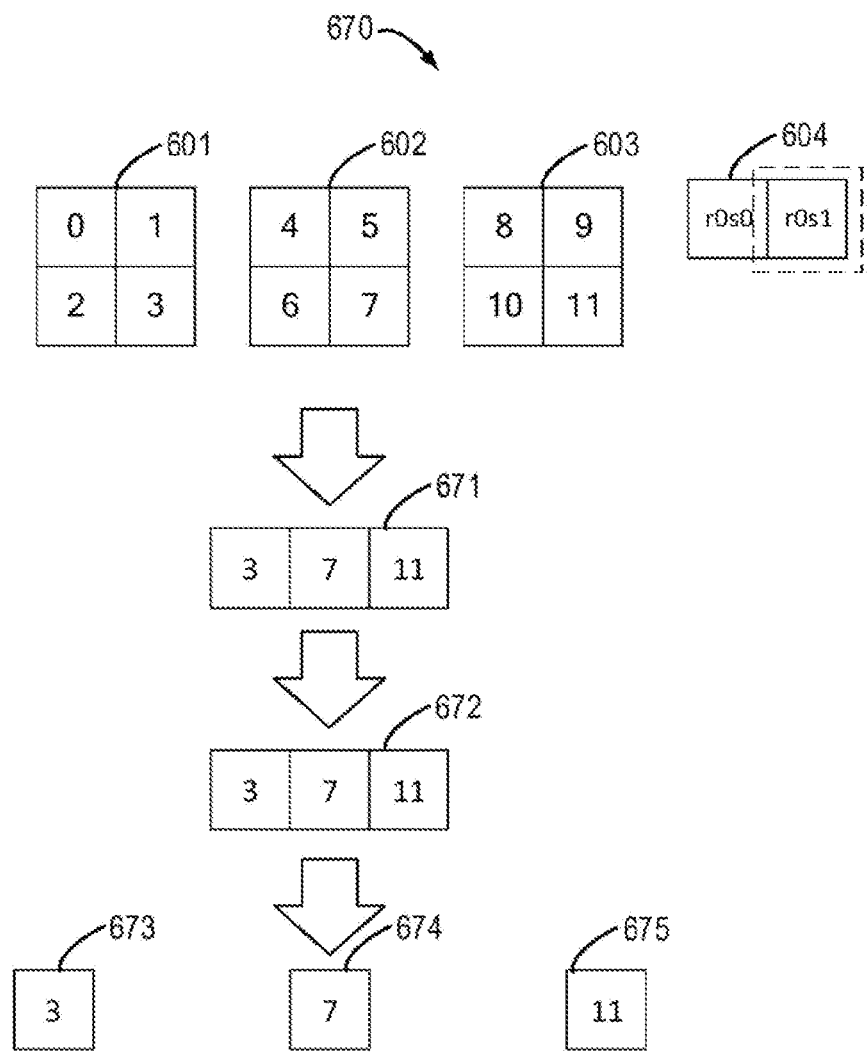

In FIG. 6G, a block r0s1 on the right portion in the convolution kernel 604 has a dotted box added to indicate that this block in the convolution kernel will be processed, reference number 671 represents data extracted from bottom left pixels in the different channels 601, 602 and 603 of the input data, reference number 672 indicates that the data 671 may be for parallel computing without transformation, and reference numbers 673, 674 and 675 represent three separate data of the data 671 extracted from the bottom left pixels in the different channels 601, 602 and 603 of the input data, processed by three dedicated data processing units, respectively.

It can be seen from FIG. 6G that the three dedicated data processing units respectively process the data 671 extracted from the bottom left pixels in the different channels 601, 602 and 603 of the input data.

Figure 6H:
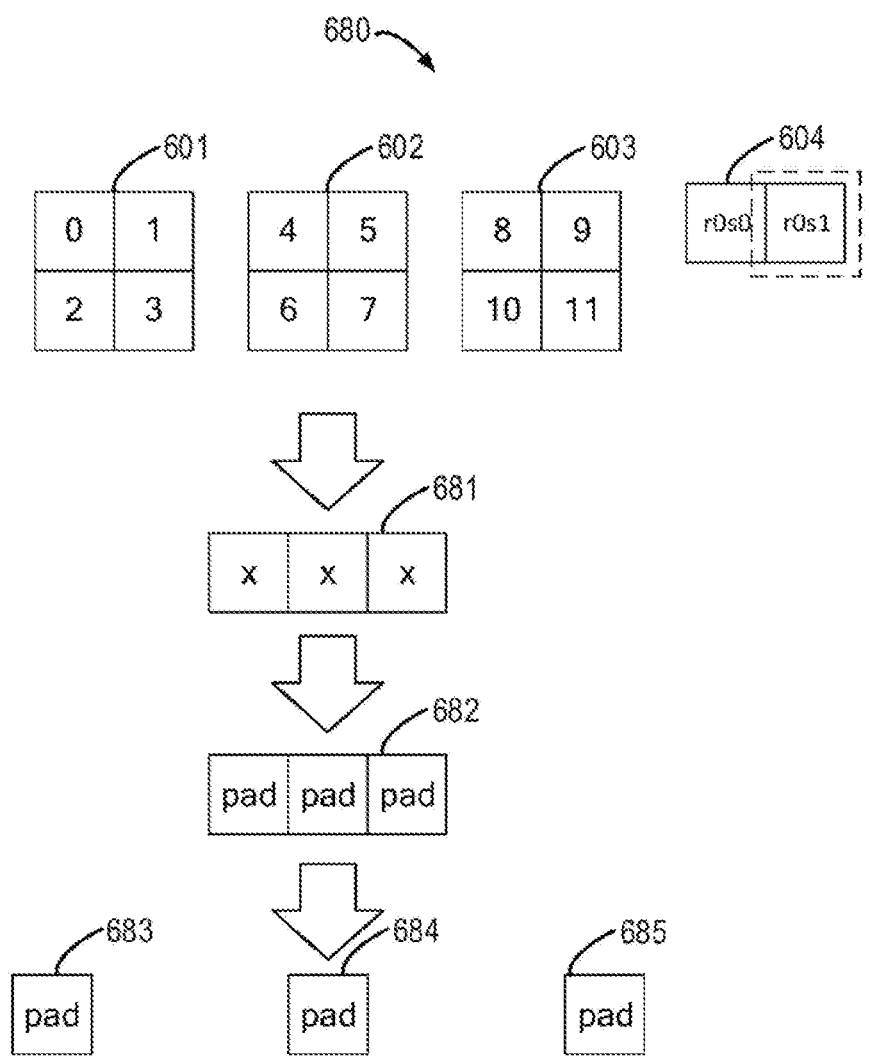

In FIG. 6H, a block r0s1 on the right portion in the convolution kernel 604 has a dotted box added to indicate that this block in the convolution kernel will be processed, reference number 681 represents data extracted from bottom right pixels in the different channels 601, 602 and 603 of the input data, and x in the box identifying these data indicates that these data are padded according to preset parameters, reference number 682 indicates that the data 681 is transformed, and padding is added according to the preset parameters and for parallel computing, and reference numbers 683, 684 and 685 represent three separate data of the data 682 extracted from the upper right pixel in the different channels 601, 602 and 603 of the input data, processed by three dedicated data processing units, respectively.

It can be seen from FIG. 6H that the three dedicated data processing units respectively process the data 682 extracted from the upper right pixels in the different channels 601, 602 and 603 of the input data.

It should be noted that, since in the examples of FIGS. 6A to 6H, the height of the convolution kernel is 1 and the width is 2, and the convolution kernel will move as a whole on the three channels 601, 602 and 603 of the input image respectively, in order to avoid the convolution kernel moving beyond the three channels 601, 602 and 603 of the input image, the left block r0s0 of the convolution kernel is only moved through the first and second columns of the three channels 601, 602 and 603 of the input data image, and the right block r0s1 of the convolution kernel is only moved through the second and third columns of the three channels 601, 602 and 603 of the input image, where the third row is the padded row.

After the separate data 613, 614, 615, 623, 624, 625, 633, 634, 635, 643, 644, 645, 653, 654, 655, 663, 664, 665, 673, 674, 675, 683, 684, and 685 are obtained as shown in FIGS. 6A to 6H, they may be spliced to obtain an output matrix, which will be described below with reference to FIG. 7.

Figures 7, 8:
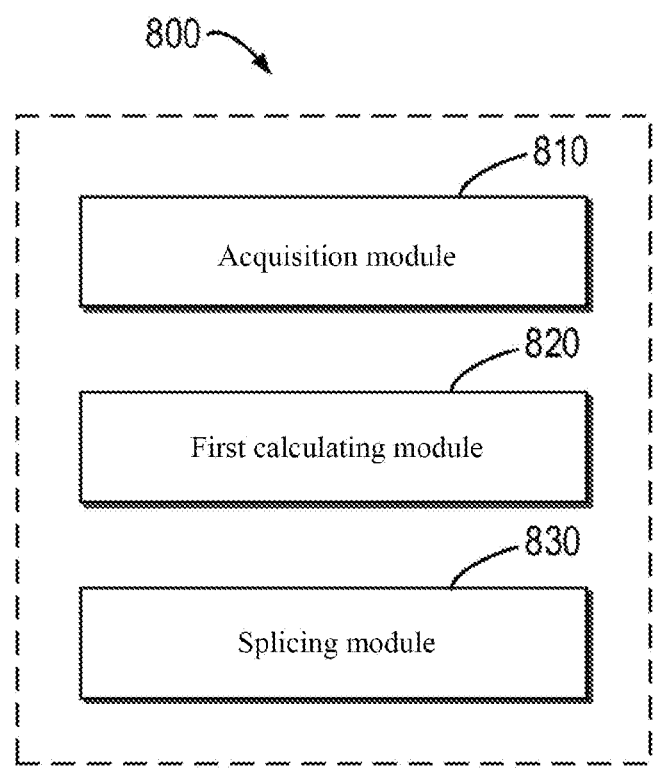
FIG. 7 shows a schematic diagram of an output matrix 700 according to an embodiment of the present disclosure.
FIG. 8 shows a schematic block diagram of an apparatus 800 for processing an image according to an embodiment of the present disclosure.

FIG. 7 shows a schematic diagram of an output matrix 700 according to an embodiment of the present disclosure. In the matrix 700, the first row is values of the separate data 613, 623, 633 and 643 associated with the block r0s0 on the left portion in the convolution kernel in the first channel 601, the second row is values of the separate data 614, 624, 634 and 644 associated with the block r0s0 on the left portion in the convolution kernel in the second channel 602, the third row is values of the separate data 615, 625, 635 and 645 associated with the block r0s0 on the left portion in the convolution kernel in the third channel 603, the fourth row is values of the separate data 653, 663, 673 and 683 associated with the block r0s1 on the right portion in the convolution kernel in the first channel 601, the fifth row is values of the separate data 654, 664, 674 and 684 associated with the block r0s1 on the right portion in the convolution kernel in the second channel 602, and the sixth row is values of the separate data 655, 665, 675 and 685 associated with the block r0s1 on the right portion in the convolution kernel in the third channel 603. It can be seen that a matrix size of the output matrix 700 is [r*s*c, out_h*out_w]=[6, 4], where each row of the output matrix 700 represents data obtained when the corresponding element of the convolution kernel slides on the image.

It should be understood that in the examples described with reference to FIGS. 6A to 6H and FIG. 7, the calculation of the block r0s0 on the left portion of the convolution kernel and the block r0s1 on the right portion of the convolution kernel in the first channel 601 is processed by a dedicated processing unit, the calculation of the block r0s0 on the left portion of the convolution kernel and the block r0s1 on the right portion of the convolution kernel in the second channel 602 is processed by another dedicated processing unit, and the calculation of the block r0s0 on the left portion of the convolution kernel and the block r0s1 on the right portion of the convolution kernel in the third channel 603 is processed by yet another dedicated processing unit. However, in practical applications, it is not limited to this corresponding relationship. Furthermore, it should be understood that the stored rows and columns in the above examples are only logical concepts and do not represent actual positions in the memory.

The contents related to the image processing environment 100 in which the method for processing an image in some embodiments of the present disclosure may be implemented, the image processing environment 200 in which the method for processing an image in some embodiments of the present disclosure may be implemented, the method 300 for processing an image according to an embodiment of the present disclosure and the method 500 for processing an image according to an embodiment of the present disclosure are described above with reference to FIGS. 1 to 7. It should be understood that the above description is for the purpose of better illustrating the contents described in the present disclosure, and is not intended to limit in any way.

It should be understood that the numbers and sizes of physical quantity of various elements used in the above accompanying drawings of the present disclosure are only examples, and do not limit the scope of the present disclosure. The above numbers and sizes may be arbitrarily set as required without affecting the normal implementation of the embodiments of the present disclosure.

Details of the method 300 for processing an image and the method 500 for processing an image according to embodiments of the present disclosure have been described above with reference to FIGS. 1 to 7. Hereinafter, modules in an apparatus for processing an image will be described with reference to FIG. 8.

FIG. 8 shows a schematic block diagram of an apparatus 800 for processing an image according to an embodiment of the present disclosure. As shown in FIG. 8, the apparatus 800 for processing an image includes: an acquisition module 810, configured to acquire an input image, the input image including a plurality of channels, and each channel of the plurality of channels including a plurality of pixel points; a first calculating module 820, configured to perform pixel extractions in parallel using a plurality of dedicated processing units on each channel of the input image, to obtain pixel point data for each corresponding pixel point of each channel; and a splicing module 830, configured to splice the pixel point data for each corresponding pixel point of each channel to obtain an output image.

In one or more embodiments, the first calculating module 820 includes: a padding module (not shown), configured to add padding to an edge of at least one side of the plurality of channels of the input image to obtain a plurality of padded channels; and a second calculating module (not shown), configured to perform the pixel extractions in parallel using the plurality of dedicated processing units on each padded channel of the plurality of padded channels, to obtain the pixel point data for each corresponding pixel point of each padded channel.

In one or more embodiments, the apparatus 800 for processing an image includes: a padding number determining module (not shown), configured to determine the number of paddings to be added based on a size of the input image and a width of a convolution kernel for performing the pixel extraction.

In one or more embodiments, the first calculating module 820 includes: a unit number determining module (not shown), configured to determine, based on the number of channels included in the input image, the number of dedicated processing units for performing the pixel extractions in parallel.

In one or more embodiments, the first calculating module 820 includes: a pixel determining module (not shown), configured to determine a pixel to be processed during the pixel extraction by each dedicated processing unit of the plurality of dedicated processing units based on at least one of: a horizontal stride of a convolution kernel for performing the pixel extraction; and a vertical stride of the convolution kernel for performing the pixel extraction.

From the above description with reference to FIGS. 1 to 8, the technical solution according to the embodiments of the present disclosure has many advantages over conventional solutions. For example, using the technical solution according to the embodiments of the present disclosure, it may flexibly support format processing of input images of various sizes, can make full use of the parallelism characteristics of hardware, and efficiently perform pixel extraction, so as to support efficient weight gradient calculation, improve the throughput of an overall calculation process, and thus improve user experience.

Specifically, by using the technical solution according to the embodiments of the present disclosure, the parameters may be flexibly configured based on received parameter configuration instructions, so that various input image sizes and convolution kernel sizes may be adapted. Meanwhile, since a plurality of dedicated processing units work in parallel, the input data processing work can be completed efficiently on the whole. In addition, since the technical solution according to the embodiments of the present disclosure is equivalent to completing the im2col operation and the transpose operation at one time, the implementation does not need to occupy additional storage space.

According to an embodiment of the present disclosure, the present disclosure also provides an electronic device, a computer readable storage medium, and a computer program product.

Figure 9:
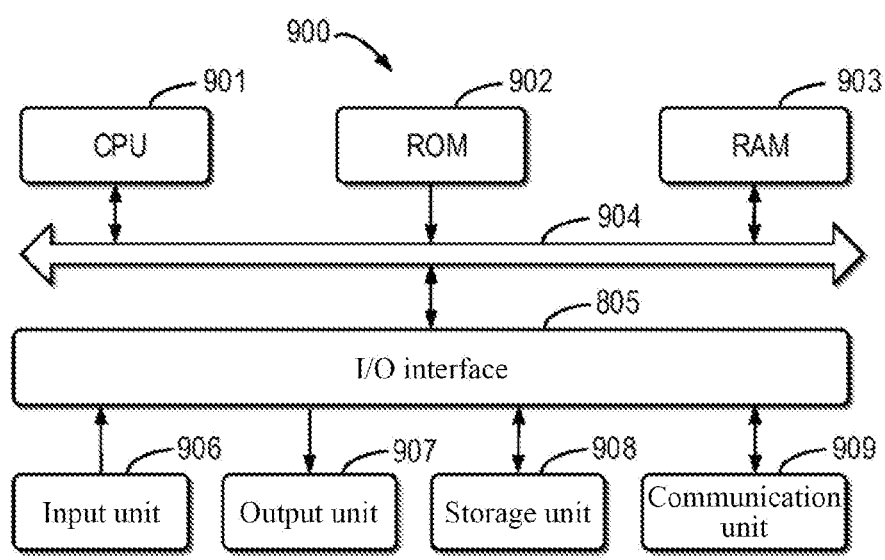
FIG. 9 shows a schematic block diagram of an example electronic device 900 that may be adapted to implement embodiments of the present disclosure.

FIG. 9 shows a schematic block diagram of an example electronic device 900 that may be used to implement embodiments of the present disclosure. For example, the computing device 110 shown in FIG. 1, the computing device 210 shown in FIG. 2, and the apparatus 800 for processing an image shown in FIG. 8 may be implemented by the electronic device 900. The electronic device 900 is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 9, the device 900 includes a computing unit 901, which may perform various appropriate actions and processing, based on a computer program stored in a read-only memory (ROM) 902 or a computer program loaded from a storage unit 908 into a random access memory (RAM) 903. In the RAM 903, various programs and data required for the operation of the device 900 may also be stored. The computing unit 901, the ROM 902, and the RAM 903 are connected to each other through a bus 904. An input/output (I/O) interface 905 is also connected to the bus 904.

A plurality of components in the device 900 are connected to the I/O interface 905, including: an input unit 906, for example, a keyboard and a mouse; an output unit 907, for example, various types of displays and speakers; the storage unit 908, for example, a disk and an optical disk; and a communication unit 909, for example, a network card, a modem, or a wireless communication transceiver. The communication unit 909 allows the device 900 to exchange information/data with other devices over a computer network such as the Internet and/or various telecommunication networks.

The computing unit 901 may be various general-purpose and/or dedicated processing components having processing and computing capabilities. Some examples of the computing unit 901 include, but are not limited to, central processing unit (CPU), graphics processing unit (GPU), various dedicated artificial intelligence (AI) computing chips, various computing units running machine learning model algorithms, digital signal processors (DSP), and any appropriate processors, controllers, microcontrollers, etc. The computing unit 901 performs the various methods and processes described above, such as the method 300 and 500. For example, in some embodiments, the method 300 and 500 may be implemented as a computer software program, which is tangibly included in a machine readable medium, such as the storage unit 908. In some embodiments, part or all of the computer program may be loaded and/or installed on the device 900 via the ROM 902 and/or the communication unit 909. When the computer program is loaded into the RAM 903 and executed by the computing unit 901, one or more steps of the method 300 and 500 described above may be performed. Alternatively, in other embodiments, the computing unit 901 may be configured to perform the method 300 and 500 by any other appropriate means (for example, by means of firmware).

Various embodiments of the systems and technologies described above herein may be implemented in digital electronic circuit systems, integrated circuit systems, field programmable gate arrays (FPGAs), application specific integrated circuits (ASICs), application specific standard products (ASSPS), system on chip (SOC), load programmable logic devices (CPLDs), computer hardware, firmware, software, and/or combinations thereof. These various embodiments may include being implemented in one or more computer programs that may be executed and/or interpreted on a programmable system including at least one programmable processor, which may be a dedicated or general programmable processor that may receive data and instructions from a storage system, at least one input device, and at least one output device, and transmit data and instructions to the storage system, the at least one input device, and the at least one output device.

The program code for implementing the methods of the present disclosure may be written in any combination of one or more programming languages. These program codes can be provided to the processor or controller of general computer, dedicated computer or other programmable data processing device, so that when executed by the processor or controller, the program code enables the functions/operations specified in the flow chart and/or block diagram to be implemented. The program code can be executed completely on the machine, partially on the machine, partially on the machine and partially on the remote machine as a separate software package, or completely on the remote machine or server.

In the context of the present disclosure, a machine readable medium may be a tangible medium which may contain or store a program for use by, or used in combination with, an instruction execution system, apparatus or device. The machine readable medium may be a machine readable signal medium or a machine readable storage medium. The computer readable medium may include, but is not limited to, electronic, magnetic, optical, electromagnetic, infrared, or semiconductor systems, apparatuses, or devices, or any appropriate combination of the above. A more specific example of the machine readable storage medium will include an electrical connection based on one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any appropriate combination of the above.

To provide interaction with a user, the systems and technologies described herein may be implemented on a computer that is provided with: a display apparatus (e.g., a CRT (cathode ray tube) or an LCD (liquid crystal display) monitor) configured to display information to the user; and a keyboard and a pointing apparatus (e.g., a mouse or a trackball) by which the user can provide an input to the computer. Other kinds of apparatuses may also be configured to provide interaction with the user. For example, feedback provided to the user may be any form of sensory feedback (e.g., visual feedback, auditory feedback, or tactile feedback); and an input may be received from the user in any form (including an acoustic input, a voice input, or a tactile input).

The systems and technologies described herein may be implemented in a computing system that includes a back-end component (e.g., as a data server), or a computing system that includes a middleware component (e.g., an application server), or a computing system that includes a front-end component (e.g., a user computer with a graphical user interface or a web browser through which the user can interact with an implementation of the systems and technologies described herein), or a computing system that includes any combination of such a back-end component, such a middleware component, or such a front-end component. The components of the system may be interconnected by digital data communication (e.g., a communication network) in any form or medium. Examples of the communication network include: a local area network (LAN), a wide area network (WAN), and the Internet.

The computer system may include a client and a server. The client and the server are generally remote from each other, and generally interact with each other through a communication network. The relationship between the client and the server is generated by virtue of computer programs that run on corresponding computers and have a client-server relationship with each other.

It should be understood that the various forms of processes shown above may be used to reorder, add, or delete steps. For example, the steps disclosed in the present disclosure may be executed in parallel, sequentially, or in different orders, as long as the desired results of the technical solutions mentioned in the present disclosure can be implemented. This is not limited herein.

The above specific implementations do not constitute any limitation to the scope of protection of the present disclosure. It should be understood by those skilled in the art that various modifications, combinations, sub-combinations, and replacements may be made according to the design requirements and other factors. Any modification, equivalent replacement, improvement, and the like made within the spirit and principle of the present disclosure should be encompassed within the scope of protection of the present disclosure.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for processing an image, the method comprising:
   acquiring an input image, the input image comprising a plurality of channels, and each channel of the plurality of channels comprising a plurality of pixel points, wherein the plurality of channels comprises a first channel comprising a plurality of rows of pixel points;
   performing pixel extractions in parallel using a plurality of dedicated processing units on each channel of the input image, to obtain pixel point data for each corresponding pixel point of each channel; and
   splicing the pixel point data for each corresponding pixel point of each channel to obtain an output image, wherein splicing the pixel point data for each corresponding pixel point of each channel comprises: generating a given matrix comprising a plurality of rows and columns,
   wherein the generating the given matrix comprises:
      generating a single row of pixel points in the given matrix, by arranging pixel points of a second row of the first channel immediately following pixel points of a first row of the first channel, wherein pieces of the pixel point data for the plurality of channels are arranged in respective rows or columns of the given matrix, and the single row of the given matrix comprises data of all pixel points of the first row and the second row of the first channel of the input image.

2. The method according to claim 1, wherein performing the pixel extractions in parallel comprises:
   adding paddings to an edge of at least one side of the plurality of channels of the input image to obtain a plurality of padded channels; and
   performing the pixel extractions in parallel using the plurality of dedicated processing units on each of the plurality of padded channels, to obtain the pixel point data for each corresponding pixel point of each padded channel.

3. The method according to claim 2, further comprising:
   determining a number of paddings to be added based on a size of the input image and a width of a convolution kernel for performing the pixel extraction.

4. The method according to claim 1, wherein performing the pixel extractions in parallel comprises:
   determining, based on a number of channels comprised in the input image, a number of dedicated processing units for performing the pixel extractions in parallel.

5. The method according to claim 1, wherein performing the pixel extractions in parallel comprises:
   determining a pixel to be extracted during the pixel extraction by each dedicated processing unit of the plurality of dedicated processing units based on at least one of:
   a horizontal stride of a convolution kernel for performing the pixel extraction; and
   a vertical stride of the convolution kernel for performing the pixel extraction.

6. The method according to claim 1, wherein the plurality of channels comprises a second channel comprising a plurality of rows, a second row of the plurality of rows of the given matrix comprises data of all pixel points of the plurality of rows of the second channel, and the method further comprises: multiplying each row of the given matrix with a corresponding block of a convolution kernel comprising a plurality of rows.

7. An electronic device, comprising:
   at least one processor; and
   a memory communicatively connected to the at least one processor; wherein,
   the memory stores instructions executable by the at least one processor, and the instructions, when executed by the at least one processor, cause the at least one processor to perform operations comprising:
   acquiring an input image, the input image comprising a plurality of channels, and each channel of the plurality of channels comprising a plurality of pixel points, wherein the plurality of channels comprises a first channel comprising a plurality of rows of pixel points;
   performing pixel extractions in parallel using a plurality of dedicated processing units on each channel of the input image, to obtain pixel point data for each corresponding pixel point of each channel; and
   splicing the pixel point data for each corresponding pixel point of each channel to obtain an output image, wherein splicing the pixel point data for each corresponding pixel point of each channel comprises: generating a given matrix comprising a plurality of rows and columns,
   wherein the generating the given matrix comprises:
      generating a single row of pixel points in the given matrix, by arranging pixel points of a second row of the first channel immediately following pixel points of a first row of the first channel, wherein pieces of the pixel point data for the plurality of channels are arranged in respective rows or columns of the given matrix, and the single row of the given matrix comprises data of all pixel points of the first row and the second row of the first channel of the input image.

8. The electronic device according to claim 7, wherein performing the pixel extractions in parallel comprises:
adding paddings to an edge of at least one side of the plurality of channels of the input image to obtain a plurality of padded channels; and
performing the pixel extractions in parallel using the plurality of dedicated processing units on each of the plurality of padded channels, to obtain the pixel point data for each corresponding pixel point of each padded channel.

9. The electronic device according to claim 8, wherein the operations further comprise:
determining a number of paddings to be added based on a size of the input image and a width of a convolution kernel for performing the pixel extraction.

10. The electronic device according to claim 7, wherein performing the pixel extractions in parallel comprises:
determining, based on a number of channels comprised in the input image, a number of dedicated processing units for performing the pixel extractions in parallel.

11. The electronic device according to claim 7, wherein performing the pixel extractions in parallel comprises:
determining a pixel to be extracted during the pixel extraction by each dedicated processing unit of the plurality of dedicated processing units based on at least one of:
a horizontal stride of a convolution kernel for performing the pixel extraction; and
a vertical stride of the convolution kernel for performing the pixel extraction.

12. A non-transitory computer readable storage medium storing computer instructions, wherein the computer instructions when executed by a computer cause the computer to perform operations comprising:
acquiring an input image, the input image comprising a plurality of channels, and each channel of the plurality of channels comprising a plurality of pixel points, wherein the plurality of channels comprises a first channel comprising a plurality of rows of pixel points;
performing pixel extractions in parallel using a plurality of dedicated processing units on each channel of the input image, to obtain pixel point data for each corresponding pixel point of each channel; and
splicing the pixel point data for each corresponding pixel point of each channel to obtain an output image, wherein splicing the pixel point data for each corresponding pixel point of each channel comprises: generating a given matrix comprising a plurality of rows and columns,
wherein the generating the given matrix comprises:
generating a single row of pixel points in the given matrix, by arranging pixel points of a second row of the first channel immediately following pixel points of a first row of the first channel, wherein pieces of the pixel point data for the plurality of channels are arranged in respective rows or columns of the given matrix, and the single row of the given matrix comprises data of all pixel points of the first row and the second row of the first channel of the input image.

13. The storage medium according to claim 12, wherein performing the pixel extractions in parallel comprises:
adding paddings to an edge of at least one side of the plurality of channels of the input image to obtain a plurality of padded channels; and
performing the pixel extractions in parallel using the plurality of dedicated processing units on each of the plurality of padded channels, to obtain the pixel point data for each corresponding pixel point of each padded channel.

14. The storage medium according to claim 13, wherein the operations further comprise:
determining a number of paddings to be added based on a size of the input image and a width of a convolution kernel for performing the pixel extraction.

15. The storage medium according to claim 12, wherein performing the pixel extractions in parallel comprises:
determining, based on a number of channels comprised in the input image, a number of dedicated processing units for performing the pixel extractions in parallel.

16. The storage medium according to claim 12, wherein performing the pixel extractions in parallel comprises:
determining a pixel to be extracted during the pixel extraction by each dedicated processing unit of the plurality of dedicated processing units based on at least one of:
a horizontal stride of a convolution kernel for performing the pixel extraction; and
a vertical stride of the convolution kernel for performing the pixel extraction.

* * * * *